United States Patent
Tempelman

Patent Number: 5,947,745
Date of Patent: *Sep. 7, 1999

[54] ATOMIC MODEL OF SIMULTANEOUS ELECTRON-PAIR-SHARING AND ALLOSTERISM

[75] Inventor: Andrew D. Tempelman, 24 Maple St., Milford, N.H. 03055

[73] Assignee: Andrew D. Tempelman, Milford, N.H.

[*] Notice: This patent is subject to a terminal disclaimer.

[21] Appl. No.: 07/873,064

[22] Filed: Jul. 6, 1992

[51] Int. Cl.$^6$ .................................................. G09B 23/26
[52] U.S. Cl. ........................................... 434/278; 434/298
[58] Field of Search ................................... 434/276, 277, 434/278, 279, 298, 281

[56] References Cited

U.S. PATENT DOCUMENTS

| | | | |
|---|---|---|---|
| 2,942,357 | 6/1960 | Adler et al. | 434/278 |
| 2,953,860 | 9/1960 | Adler et al. | 434/278 |
| 3,183,608 | 5/1965 | Jierree | 434/278 |
| 4,557,482 | 12/1985 | Wharton | 434/278 X |
| 4,622,014 | 11/1986 | Mikelsaar | 434/278 |
| 5,030,103 | 7/1991 | Buist et al. | 434/278 |

FOREIGN PATENT DOCUMENTS

| | | | |
|---|---|---|---|
| 0597762 | 2/1948 | United Kingdom | 446/118 |

Primary Examiner—Jeffrey A. Smith

[57] ABSTRACT

An atomic model in a single piece of injection-molded plastic is provided herein which represents the two electrons in co-valent electron bonding between atoms, and simultaneously represents the allosteric spin capability around an axis perpendicular to the centers of two conjoint co-valent electron faces on two atoms. This model includes a small cylindrical stud arising from a flat face cut into one (or up to four) curved surfaces or segment(s) of a physical three-dimensional spherical body which represents the electron available for donation by an atom. It also includes on each face a hole which is cut intaglio or dropped vertically into the face of the atom next to the raised stud. This hole is arced in a 90-degree arc about the contiguous electron-representing stud which arises above it like a nose above a smiling mouth. This arced slot represents the available space in the outer shell of the receiving atom into which a donated electron-stud from another atom may be inserted. The arc permits the two mutually opposed and inserted electron-representing studs to circumscribe arcs about each other when mutually inserted, and when twisted by the model maker's wrist action, achieving up to 180 degrees of spin about the axis circumscribed by two so-mutually alterably positioned electron-studs overagainst each other.

1 Claim, 1 Drawing Sheet

ATOMIC MODEL OF SIMULTANEOUS ELECTRON-PAIR-SHARING AND ALLOSTERISM

BACKGROUND OF THE INVENTION (1) Field of the Invention

The present invention relates to models used for representing atoms, (and when connected to each other, for representing molecules, also), and in particular to a novel and improved model of this type which represents electron pair-sharing and simultaneous allosterism or spin capacity about the axis established along the line of the covalent bond between the two shared electrons of the two conjoined atoms, this simultaneity being an otherwise difficult and hitherto unsolveable problem.

(2) Description of the Prior Art

Several patents have been established relating to molecular and atomic models.

(a) For example, U.S. Pat. No. 5,030,103, patented Jul. 9, 1991, by Buist, et al, is elaborate in the extreme, containing a large number of separate and motile parts, a large number of lobes and grooves, pins and rings, of raised and cut features; even wires 29 are required. It is therefore extremely complex to assemble, and costly to produce, whether in plastic, metal, a combination of these, or of any other medium. And it is confusingly called a molecular model. Beside that the inventor does not indicate what the verticle arcuate swing of the levers or arms are intended to represent in the real atomic world. Buist does state in his abstract that the assembly includes a three dimensional body representing an atomic core. Presumeably, he means an atom.

In contrast my small sphere simply represents an atom with flat faces cut onto it, one face for each electron-representing stud to donate or share, and a receiving slot for an electron-representing stud to be inserted into, one such face for hydrogen, two faces for oxygen, three faces for nitrogen, four faces for carbon. My model is a model of simplicity.

Buist however elaborates a "first cylindrical hole," longitudinally in the center of the central unit, which has no referent in the atomic or molecular world. No atom has a cylindrical hole so it is impossible to know what this represents. My model has no central longitudinal cylindrical hole, because the atom has no central longitudinal cylindrical hole, and nothing that acts like such a hole, either. I do make use of a small, simple cylindrical hole for a non-claimed function to represent what is known in chemistry as the "delta positive" capacity of some atoms. This hole is located on the rounded ends of some embodiments of my model: on the oxygen, hydrogen, and nitrogen embodiments, for receiving an electron-representing-stud as in hydrogen bonds, but I make no claim for this cylindrical hole.

Buist next elaborates "a plurality of connecting guiding elements, e.g., arcuate lobes project from". . . the body, and "a plurality of arcuate slots . . . inset into such three-dimensional body." The word "slots" here brings Buist's mode as close to my model presented herein as it ever comes. But the Buist slots are for axial arcuate pivoting of projecting arms. These separate arms are fitted into the slots by complicated groves, allowing vertical movement only, and seem capable of representing only the electron, but not the open space on the outer electron shell of the electron into which another electron may be inserted. In my model the slot represents only the available space in the outer electron shell into which a covalent electron may be represented as received. The wrist end of Buist's projecting arm or lobe is capable of either insertion or of reception. This feature is quite different from my model in which the stud, the male member, is the only member which represents an electron and can be inserted. And the slot is the only part of the model which will receive another stud, as the proper female member should. The word "slot" does not make my model and the Buist model the same or similar. Buist has a female end on the end of a male end.

Let us examine these stud and slot features of the Buist model closer to see whether Buist has already captured the ideas of electron-pair-sharing and of allosterism, and of reresenting these ideas simultaneously, and even more importantly of doing so as I propose to do in a novel way.

Buist does not actually disclose "a molecular model having a small cylindrical stud (113) which fits into an arched slot (112) of a representation of a carbon atom (110)." His stud (113) is not cylindrical except on one end; on the other end it is a rectangular cuboid called a "yoke" 115 (or 114) which forms the shoulder bone of the vertically arcing projecting arm, in both FIG. 12 and FIG. 13. (And this "stud" is sometimes male (113$m$) and sometimes female (113$f$).) This yoke or separate piece must be "compressed slightly to fit into the slot 112" and is further complicated by being split at one end into "two spaced apart legs 115$a$" allowing compression for insertion into the slot. And the small cylindrical stud does not fit into an arched slot, but into the yoke 114 (in one representation: FIG. 13). Buist even uses a separate flexible pin 117 to lock the split yoke onto a central cylinder.

And the fit of this separable hybrid cylinder-yoke into the arched slot in Buist is different from my model in two ways: first, his arch or arc follows the rounded contour of the outer body shape of the atom sphere vertically, whereas my arc is cut vertically into a flat face on the round atom sphere, not on the rounded contour of the atom-sphere. My arc circumscribes two contiguous electron-representing studs. As such, the deciding difference is that the Buist arc is intended to represent variable "internuclear distances which correspond," he says, to various carbon bonds between two atoms, whereas my model makes no such effort. My arc is intended to represent only the spin of two contiguous atoms about an axis perpendicular to their contiguous faces, but to accomplish this simultaneously with the sharing of two spatially separate stud-electrons. The Buist model is incapable of this achievement.

Very significantly, Buist's rotation or what I call allosterism or spin about an axis is achieved by what he calls "free rotation . . . allowed by the ring and groove connection" in the wrist of his hybrid cylinder-yoke arm, where the male pin 13$m$ rotates inside of the female arm 13$f$, but rotates more or less depending upon the depth of the male wrist insertion into the female wrist. There is no trick to the Buist spin or rotation. It is the simple rotation of a round stud in a round hole. In my system two studs are permitted to rotate about each other!

One is at a loss as to what the verticle ar or slot in the atom-sphere body is intended or supposed to represent, or to accomplish in the Buist model, from his descriptions or from his drawings. Thus Buist cannot avoid the problem, as he admits, that some of his electrons must be represented as male and the others as female. In my model both electrons in a co-valent bond are represented by male studs, and both open positions in the outer electron shell of both conjoint atoms are epresented by female slots. And when conjoined these four elements, two sets of opposing studs and slots, each filling the other, accomplish both the ideas of electron pair-sharing and the capacity of allosterism simultaneously.

The mere fact that both models have pins or studs and slots does not make them the same, obviously. A "slot" by itself may represent anything or nothing (as Buist's verticle arc seems to have no function.) A slot may be one of a host of varying sorts of holes, with a variety of possible shapes and as many functional possibilities. Buist's slots and lobes and yokes arcing or pivoting in complicated grooves within the slots, and with an "arm projecting outward" from each one, do not serve the same purpose as my electron-receiving slot does. For Buist, again, the slot is only an axial or shoulder area groove for the movement of an arm by which to represent a variety of carbon bonds: single, double, and double-single. For me the slot always and only represents the available open space in the outer electron shell for an incoming electron from another atom to help complete the outer shell with a full complement of electrons. The arc in this slot in my model exists only to allow for allosterism, or hard alteration, of the position of the fixed incoming stud in the slot, to the right or left of the other opposite electron-stud in its slot, and of all the molecular structure synthesized behind both electron-studs, and contingent upon their mutual positions, and not the movement of an arm on a pivot.

In Buist's model there are a multitude of separate, moving parts. My model has no moving parts. And the Buist model will be extremely difficult and therefore costly to build out of plastic or metal with all of these complex flanges and grooves and separate moving parts, requiring incredibly intricate and expensive "side-actions" in plastic molds. The man who made my mold is a plastic mold maker by trade. I therefore know the great expense to construct a plastic mold for the the Buist model, probably the cheapest method of production possible. My model atom costs only ½ cent per piece to build with a hot plastic injection molding process. It is immensely more simple, and incomparably cheaper to fabricate.

The inventor claims that all of this movement of many separate parts will represent (1) "change in geometry" from a tetrahedral to a trigonal molecule, and (2) loss or gain of "torsional freedom" in double, single bonds, and double-single bonds; (I do not believe that double bonds are possible in the Buist model despite his claim to represent them; and I make no claim for double-bond representation with this application);

Contrastingly, in my model there are no moving parts. The movement is only allosteric adjustment, by finger and wrist twisting of the two solid, single-piece, facing atomic model units, say an oxygen and a carbon, to the right Dr to the left, pushing the two fixed studs in either direction in their counter-face receiving arcuate slots.

The allosterism which the Buist model does manage to achieve, and which is achieved with extremely complicated machinery, and without accomplishing electron pair sharing with separate electron-studs, my model achieves simultaneously, and without moving or separable arms or parts of any kind.

Further, the Buist model has "Tinkertoy"-like (tradename) male members that slide into cylindrical female shafts or barrels at the wrists of the vertically arcing arms. These are presumeably representations of electrons. The abstract does not state what they are intended to represent beyond "various torsional and configurational changes which commonly occur during chemical transformations." They cannot however represent what my model represents, namely, electron pair sharing by two physically separate studs which never touch either, like the male electron and the female electron do in Buist, but which go past each other into the opposite faces of the atom. This is the ingenious accomplishment of my invention: I give the model maker -he capacity to share a pair of electrons, to press two studs into each other's faces, but also to have the allosterism of spin about a horizontal axis between the two hands holding the two parts, that would otherwise seem possible only with a single stud in a single hole, as with poppet-beads in the well-known necklaces made from them, or as in the Buist model. In the Buist model one electron is a female and the other a male but both cannot be male representations of the electron. In my model all electrons are male; the female part of the representation is the arced slot on the flat face of each sphere, of each atom, representing the open space for an electron, the male member, to enter in order to complete the outer shell of the opposite atom. This representation does not occur in the Buist model.

Again in the Buist model the male electron and the female electron are both extended like a male member out to the tip, where one is male and one female, but both far from the body of the atom where they can unite, whereas in my model, designed to be a three-dimensional space-filling model, the electron studs are buried out of sight in the body of the atom, far closer to what really happens in chemistry, and are not visible like the long extended arms of the Buist model. In my case the small stud represents an electron. And the arced slot cut into the flat face of the sphere is arced to represent the continuum of various locations in the arc that the shared electrons may occupy overagainst each other (representing quantum/stadistical locations) in the outer shell of the receiving atom.

My model makes no claim for molecules, only for atoms, and for molecules only insofar as they are secondarily affected by the invention proposed with respect to the atomic electrons in this model.

The Buist model may be faulted from my point of view, further, since it has according to Buist's description, three (3) "equiangularly-spaced-apart arcuate slots" which are "primarily intended for the representation of carbon atoms." In another place, FIG. 1, the carbon atom is represented by five (5) extensions, which presumeably represent electrons, there also. Carbon however has four electrons to share. This equal-distanced tetrahedral character is well represented in my model with four equidistant flat faces cut (molded) onto the plastic carbon sphere, though I make no special claim for this feature, except of the stud-slot combination on each such face with its simultaneous electron-pair sharing and allosterism combination achievement.

Other models, more briefly distinguished from the model herein presented are:

(b) "Three-Dimensional Model of Molecular Structure" by Mikelsaar, U.S. Pat. No. 4,622,014, dated Nov. 11, 1986. This model has separate connecting members. In my model the connecting member, representing the electron, is part of the atom model, not a separate and separable piece.

The Mikelsaar model also uses X-ray contras materials placed at the center of the atom spheroid for purposes of X-ray photography. I make no such claim.

The Mikelsaar model also represents electrons as single studs, but each stud fits only into a simple cylindrical hole, so that it cannot be shifted to the right or left of its point of entry; whereas in my model the receiving hole its an arced slot of 90 degrees on the flat receiving face. In the Mikelsaar model no combination of electron pair-sharing and allosterism is possible, as my model allows. exclusively.

(c) "Atomic Units for Molecular Models" by Adler et al, U.S. Pat. No. 2,942,357, dated Jun. 28, 1960, seeks to provide a model which can be adjusted for "three important parameters namely, bond length, bond angle and van der Waals radii." I make no such claims of adjustability. My bond angle is always contingent upon flat face-to-face contact, and my bond length is always the same, the length of the stud. I make no claim for any van der Waals bond angles or distances.

This Adler model also claims "buttons" on the planar face which one atom unit places against another face. I know the main problem with buttons, namely, that buttons are extremely expensive to mold plastic for, requiring at least two separate side-actions in the plastic mold for each button as well as separate side actions for each face on the sphere, so I have avoided buttons entirely. I also know that buttons are very hard to work with in model building, both in insertion, and in disconnection. I also know that simple buttons do not enable a model to represent electron pair sharing. And the simple fined stud representing an electron, which my model bears, violates no one's claim.

The Adler model also allows no movement of the electron button, if that is what it is, to the right or left, with its enabling of allosteric shift, as my model does.

The addition of "T-shaped units" also rigidifies the Adler model, adds more pieces, increases the cost while losing the allosterism, and is thoroughly opposed to what my model seeks to do in combining allosterism with electron pair-sharing. Further, these T-shaped pieces or protrusions represent nothing that I know of in the real atom.

The addition of set screws and other rigidifies parts sets this model completely apart from mine.

(d) "Puzzle Comprizing Interconnected Arcuate Channel Member" by Wharton, U.S. Pat. No. 4,557,482, dated Dec. 10, 1985, with its rigid chamber channels, separate set screws, marbles, etc., intends to be a puzzle, and apparently has no intention of representing atoms, or atoms in molecular arrangements, and so has no relationship to the model I propose.

(e) The Jierree "Molecular Model" dated May 18, 1965, U.S. Pat. No. 3,183,608, represents the orbital rings and electrons, protons, and neutrons, internal to the atom. My model represents only the available electrons on the outer ring of the atom, each electron represented by a simple fixed single stud.

The Jierree model also employs separable dowels and screw-in "valence-plugs" in FIG. 9 that do not even correspond with what they are asked to do in FIG. 8 of that patent description. Besides, the atom seems to be presented as a disk, rather than as a spheroid, as in my model of the atom, with concentric grooves for small balls or beads to revolve or stay fixed in, the author does not specify which.

Consequently there is no conflict between my model and the Jierree model.

(f) Another Adler. et al, model, "Atomic Units for Molecular Models," U.S. Pat. No. 2,953,860, dated Sep. 27, 1960 consists of plates, springs, screws, other threaded members, foam rubber washers, magnets, separable tapered plugs, etc.

My model is one single piece.

(g) U.S. Pat. No. 4,325,698, dated Apr. 28, 1987 has flexible arms radiating out from a central body with connections being made between an annularly ribbed male member and a female member. This, like the Buist model, fails the pair-sharing test, allows no allosterism between shared electron pairs, and is thus completely unlike my model.

(h) U.S. Pat. No. 4,398,888, dated Aug. 16, 1983, by Darling et al, has the same extended arms, with holes at the ends for receiving similar male extensions from other similar units. However, again, the pair sharing with simultaneous allosteric capability is missing, and so is totally unlike my claim.

i) Dreiding's U.S. Pat. No. 4,020,656, dated May 3, 1977 does the same thing with valence arms each containing outer and inner end extensions, therefore allowing the representation of pair-sharing, but allowing no allosterism, and certainly no simultaneous allosterism, as well as not permitting space-filling representation in which the electrons are buried in the r proper place inside the atom, such as my model allows.

(j) Bramlik's U.S. Pat. No. 3,333,349 date Aug. 1, 1967 employed cuttable tubing, allowed no pair-sharing of electrons, and allowed no allosterism between shared pairs of electronstuds, as my model does.

(k) Bramlik's earlier U.S. Pat. No. 3,080, 662 dated Mar. 2, 1963 had multiple subunits or pieces, one for the atom, one for connections between atoms, and one or more representing the three-dimensional character of an atomic orbital. My model is simplicity in contrast—one single piece—it has no multiple parts representing parts of the atom, but only one hot plastic injection-molded piece representing the entire atom, its covalent electrons extending from flat faces, and the capacity to pair-share electrons, and to do so allosterically, at the same time.

(l) Sato, U.S. Pat. No. 3,510,962, dated May 21, 1970 attempted to represent exact bond angles within and outside of molecules. He proposed a 14-faceted polyhedral and several polyhedrals with more and fewer faces, each face with a hole into which separable rods could be inserted. I have gone way beyond this with my model of a single unit atom with opposing studs on flat faces for electrons representing in conjunction, the capacity for simultaneous electron pair-sharing and allosterism.

(m) U.S. Pat. No. 3,230,643 dated January 1966, by Mathus, had a multiple-unit atom with metal tubing for the bonds. The set required gluing the plastic parts.

SUMMARY OF THE INVENTION

The advantages of the invention are (1) the representation of electron pair-sharing by means of two studs representing electrons, in conjucnction with (2) allosteric spin capability of these electron studs in arcs around each other after they have both been inserted into the 90 degree arced receptor holes opposite each other, each arced hole or slot located beneath each stud like a smiling mouth beneath the stud-nose.

No other model has been able to achieve this simultaneous representation of co-valent electron pair-sharing and allosteric spin capability. No other model has been able to accomplish both of these atomic facts with with a single piece of plastic, and without any moving or separate parts, either. Therefore this model solves an important problem in atomic and molecular modeling, and is able to be manufactured and sold very inexpensively.

This spherical atom model, when it contains only one face as described with stud and slot, represents a hydrogen atom with a single electron and a single space for a shared electron. When the sphere is cut with two faces, the representation is an oxygen model. When the sphere bears three faces, it represents nitrogen, and when it bears four faces, each with an electron-stud nose and a smiling mouth or contiguous arcuate slot, it represents a carbon. These are colored the conventional colors white, red, blue and black, respectively. When combined they can be made to represent simple molecules like carbon dioxide, ammonia, water, or methane.

DESCRIPTION OF THE PREFERRED EMBODIMENT

Figure 1:
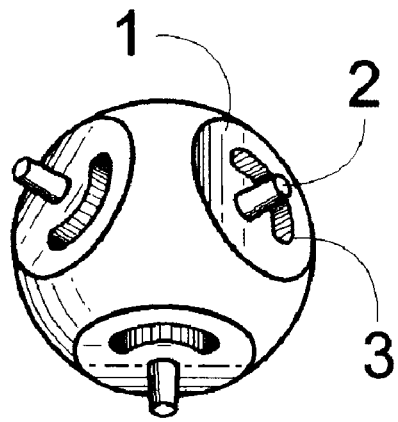
FIG. 1 is a perspective side view of the stud and arced slot combination in one face of a model in accordance with the invention.
Figure 2:
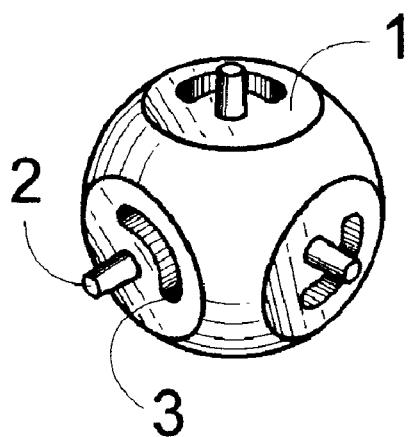
FIG. 2 is a perspective side view shifted so that three faces (in this instance, three faces of a four-faced carbon model) are showing, revealing the arrangement of the fixed stud and the arced slot in each face.
Figure 3:
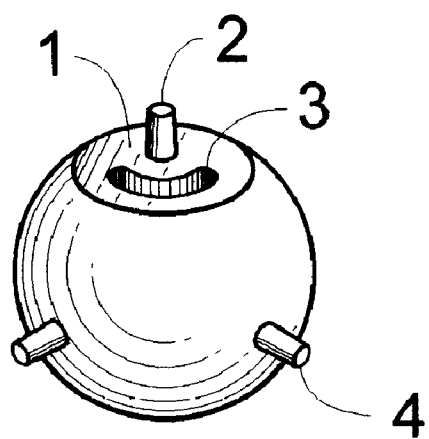
FIG. 3 is a perspective view of an atom (the oxygen) model with only two faces, each with its electron stud (2).

Description of FIGS. 1–3

As seen in FIGS. 1 and 2, the physical representation of the atom (carbon, in this embodiment) includes three visible (1 invisible at the rear of the drawing) faces 1, each with one stud 2, and each with one slot 3.

In FIG. 2 these elements 1,2 and 3 of the model are visible from shifted and tilted angles.

In FIG. 3 the two faces 3 of an oxygen atom model are seen. The small simple hole representing the "delta plus" electropositivity of the oxygen atom is not visible but located at position 4.

What is claimed is:

1. A model for simulating an atom, for representing co-valent electron pair-sharing, and for demonstrating the spin capability known as allosterism comprising:

a spherical body having an outer surface and representative of an atom, said outer surface of said spherical body defining at least one flat face, wherein when said spherical body is placed in conjunction with another said model said flat face represents the alteration of the spherical body;

a cylindrical stud having an exterior circumferential vertical wall and being of a predetermined size, said cylindrical stud being connected to and extending perpendicularly and outwardly from said flat face, said cylindrical stud for representing an electron on the spherical body; and an arcuate slot formed in said flat face and sized to receive a cylindrical stud of another said model, said arcuate slot being located in proximal juxtaposition relative to said cylindrical stud and having vertical walls extending perpendicularly and inwardly of said flat face, wherein the vertical walls of said arcuate slot provide a frictional surface which provides frictional bonding to a cylindrical stud circumferential vertical wall of another said model when said cylindrical stud of said other model is placed within said arcuate slot, the arcuate slot thus allowing the cylindrical stud of said other model to circumscribe an arc about an axis formed by a conceptual line joining the centers of each of said models when said face of said model and the face of said other model are linked by their respective opposing cylindrical studs in their respective opposing arcuate slots.

* * * * *